United States Patent Office 3,730,916
Patented May 1, 1973

3,730,916
PROCESS OF TREATING MICROCELLULAR POLYMERIC STAPLE FIBERS TO RENDER THEM POSTINFLATABLE
Arthur William Etchells III, Philadelphia, Pa., assignor to E. I. du Pont de Nemours and Company, Wilmington, Del.
No Drawing. Filed July 13, 1971, Ser. No. 162,281
Int. Cl. C08j 1/26
U.S. Cl. 260—2.5 N                                  6 Claims

ABSTRACT OF THE DISCLOSURE

An improved process is provided for introducing impermeant inflatant into the cells of a closed-cell polymeric foamed structure. Prior-art processes include treatment of the structure with (1) "plasticizing" liquid, which plasticizes the cell walls to permit fluids to diffuse into the cells, (2) "boosting" liquid containing impermeant inflatant, which diffuses into the cells while the walls are plasticized, but normally does not permeate the cells when the walls are not plasticized, and (3) "stripping" liquid, which removes the plasticizing liquid, deplasticizes the cell walls and traps impermeant inflatant within the cells. Fibers so treated become fully inflated when exposed to air. The improvement in this process comprises treating the foamed structure with plasticizing and boosting liquids that are dispersed and/or dissolved in water at concentrations below 10%, and preferably below about 3%.

BACKGROUND OF THE INVENTION (1) Field of the invention

This invention relates to an improved process for introducing impermeant inflatants into closed-cell structures of foamed organic polymers. More specifically, the improvement concerns carrying out the process with dilute concentrations of inflatant and plasticizer dispersed or dissolved in water.

(2) The prior art

Numerous types of foamed polymeric materials are used for cushioning applications. Among those that are particularly useful are thin-walled, closed-cell, foamed polymeric structures that confine gases within the closed cells and are pneumatically resilient. The improved process of this invention concerns these latter types of structures, particularly those comprising microcellular fibers containing impermeant inflatant.

An impermeant inflatant permeates the cell walls so slowly that it is permanently retained within the foam cells, regardess of the frequency or duration of compressive loading. The presence of impermeant inflatant within the cells creates an osmotic gradient for inward permeation of air. Thus, on exposure to air, an equilibrium is established wherein the partial pressure of air in the cells becomes essentially atmospheric and the total internal pressure becomes superatmospheric. This produces full inflation of the closed cells. Moreover, even if some air is lost during compressive loading, impermeant inflatant remains and causes spontaneous regain of both volume and pneumaticity of the foam structure when the compressive force is removed.

Several methods are known for introducing impermeant inflatant into the closed cells of the foamed structure. One method, as disclosed in U.S. 3,375,211, is to incorporate the impermeant inflatant in the foamable composition prior to its extrusion to form the foam structure. However, it is frequently preferable to add impermeant inflatant to the foamed structure in a "postinflation" step, instead of, or in addition to, being incorporated in the as-extruded foam.

"Postinflation," as used herein, refers to the overall process in which previously formed foam, either collapsed or gas-inflated, is: (1) exposed to impermeant inflatant while the cell walls are plasticized and are temporarily of greatly enhanced permeability; (2) treated to quickly strip off the plasticizing agent by vaporization; and (3) equilibrated in air (preferably heated) until the foam regains its maximum volume.

U.S. 3,381,077 discloses a postinflation process in which foamed, closed-cell, polymeric, staple fibers are continuously conveyed on or between reticulate conveyor belts as beds of fiber, being drawn sequentially through three closed vessels where they are either immersed in or showered in sequence by (1) a "plasticizing" liquid preferably heated to its normal atmospheric boiling point, (2) a "boosting" liquid, comprising a substantially saturated solution of impermeant inflatant in plasticizing liquid, which is usually maintained at, or somewhat below the normal atmospheric boiling temperature of the mixture, (3) a "stripping liquid" such as water (or other similarly inert fluid) at a sufficiently elevated temperature to quickly vaporize substantially all of the residual plasticizing liquid and superficial impermeant inflatant. In this manner, plasticization of the cell walls is so suddenly terminated that impermeant inflatant becomes trapped within the closed cells of the foam fibers. The vapors are simultaneously withdrawn to appropriate solvent-recovery means. Thereafter, postinflation is completed by exposing the fibers to heated air at a temperature below the melt or flow temperature for the polymer, e.g., usually at 70 to 175° C. Liquid and vapor seals are, of course, provided at the entrance and exit of each vessel. U.S. 3,381,077 also discloses that the plasticizing and inflating steps can be combined and carried out simultaneously. In another continuous process for postinflating closed-cell foamed fibers, as disclosed by Cichelli et al. in copending application S.N. 738,522, filed June 20, 1968, the fibers are transported and treated in a pipeline while submerged in and carried sequentially by plasticizing, boosting, and stripping liquids.

In each of the above-described continuous postinflation processes, the treatment of the fibers with plasticizing and boosting liquids usually is carried out in essentially 100% organic liquids. However, this generally requires specially designed seals, special handling procedures, large inventories of expensive organic liquids, major recovery facilities and other costly steps needed to minimize evaporation and carryover of one liquid from one step to the next. The improved process of this invention minimizes these difficulties and provides a rapid, inexpensive method for postinflating closed-cell foam structures.

SUMMARY OF THE INVENTION

An improved process is provided for introducing impermeant inflatant into the cells of a closed-cell polymeric foamed structure, which process includes treatment of the structure with a plasticizing liquid and a boosting liquid containing impermeant inflatant, the improvement comprising treating the foamed structure with aqueous dispersions and/or solutions of the plasticizing liquid and the boosting liquids in low concentrations. Concentrations below 10% by weight of water are suitable; those below 3% are preferred. The plasticizing and boosting can be carried out sequentially or simultaneously, the latter being preferred.

DESCRIPTION OF THE INVENTION

In the improved process of this invention, the starting material is a closed-cell foamed polymeric structure, preferably in the form of microcellular staple fibers. Microcellular fibers and processes for inflating them are known in the art. The fibers are made of a foamed polymer having discrete polyhedral shaped closed cells defined by cell walls less than two microns in thickness, with substantially all of the polymer being present in the cell walls. As described by Blades et al. in U.S. 3,227,664 and Bonner in U.S. 3,381,077, these microcellular fibers contain at least $10^3$ cells./cm.$^3$, the average transverse dimension of the cells is ordinarily less than about 1000 microns in the expanded state, and the cell walls exhibit uniplanar orientation and uniform texture. The fibers, when in a collapsed state, have densities usually in the range from 0.05 to 0.1 g./cm.$^3$; but when fully inflated their densities are in the range from 0.016 to 0.030 g./cm.$^3$, and their diameters are from about 0.03 to 0.10 inch. The length of the staple fibers is from about 1.5 to 8 inches. Preferably, the fibers are made of polyethylene terphthalate prepared as described in the aforesaid U.S. patents.

The microcellular staple fibers in the collapsed state can be postinflated (called postinflated, to distinguish from inflation occurring during the spinning of the fibers) by exposing them to impermeant inflatant while the cell walls are plasticized and temporarily of greatly enhanced permeability.

As described above, prior art processes for postinflating microcellular fibers, require the plasticizing and inflating steps to be carried out in liquids that are substantially 100% organic liquids. It has now been found that the difficulties associated with the use of substantially all organic systems can be minimized by carrying out the plasticizing and inflating steps in aqueous dispersions and/or solutions in which the plasticizer and/or impermeant inflatant are contained in low concentration. Concentrations below 10% are generally suitable, even though concentrations somewhat above 10% are still workable. However, the preferred range of concentrations of plasticizing or "boosting" liquid is below 3%.

Suitable microcellular fibers for use in this invention are prepared from synthetic crystallizable, organic polymers, and as described in U.S. Patent 3,227,664, include polyhydrocarbons such as linear polyethylene, stereoregular polypropylene or polystyrene; polyethers such as polyformaldehyde; vinyl polymers such as polyvinylidene fluoride; polyamides, both aliphatic and aromatic, such as polyhexamethylene adipamide and polymetaphenylene adipamide and polymetaphenylene isophthalamide; polyurethanes, both aliphatic and aromatic, such as the polymer from ethylene bischloroformate and ethylene diamine; polyesters such as polyhydroxypivalic acid and polyethylene terephthalate; copolymers such as polyethylene terephthalate-isophthalate, and the like. The polymers are of at least film forming molecular weight.

Suitable plasticizing liquids for use in the prior art process, on which this invention improves, and which are therefore useful in this invention, are described in U.S. 3,381,077 as having relatively small molecules in order to promote permeation through the cell walls and being able to plasticize (e.g., swell) the cell walls without dissolving other than very minor proportions of the polymer. The term "plasticizing liquid" as used herein means a volatile, low boiling, liquid substance which is essentially a non-solvent for the polymer employed at or below the boiling point of the fluid, but which has sufficient solvent power to swell (i.e., plasticize) the foamed polymer. Suitable plasticizing liquids for foamed fibers of polyethylene terephthalate include methylene chloride, chloroform, ethylene chloride, and dichlorofluoromethane. Methylene chloride with a boiling point of about 41° C. is preferred not only because it is optimum in the above properties but also because it is relatively inexpensive, nontoxic except in extreme exposures, and substantially nonflammable.

The term "impermeant inflatant" as used herein means the same as it does in the prior art, namely, a gas or liquid of low boiling point which permeates the cell walls of the unplasticized microcellular structure so slowly, as compared to air, that it is for practical purposes permanently retained within the closed cells, even under compression, but which readily permeates the cell walls of the plasticized structure, and which has large molecules as is consistent with a vapor pressure of at least 50 mm. of mercury at normal room temperature. U.S. Pat. 3,381,077 describes impermeant inflatants that are suitable for use in prior art processes. These are also suitable for the improved process of this invention. These impermeant inflatants are selected from the group consisting of sulfur hexafluoride and saturated aliphatic or cycloaliphatic compounds having at least one fluorine-to-carbon covalent bond and wherein the number of fluorine atoms preferably exceeds the number of carbon atoms. Preferably these inflatants are perhaloalkanes or perhalocycloalkanes in which at least 50% of the halogen atoms are fluorine. Although these inflatants may contain ether-oxygen linkages, they are preferably free from nitrogen atoms, carbon-to-carbon double bonds, and reactive functional groups. Specific examples of impermeant inflatants include sulfur hexafluoride, perfluorocyclobutane, sym-dichlorotetrafluoroethane, chloropentafluoroethane, perfluoro-1,3 - dimethylcyclobutane, perfluorodimethylcyclobutane mixtures, 1,1,2 - trichloro - 1,2,2-trifluoroethane, $CF_3CF_2CF_2OCFHCF_3$, chlorotrifluoromethane, and dichlorodifluoromethane. Particularly preferred because of its inertness, appreciable molecular size, very low permeability rate, and lack of toxicity is perfluorocyclobutane, especially when the microcellular fibers are prepared from polyethylene terephthalate.

The term "stripping liquid" as used herein means a liquid at normal conditions, that is, a nonsolvent for the microcellular fibers and nonreactive with the impermeant inflatant and the plasticizing fluid. The function of the stripping liquid is to aid in physically stripping excess inflatant and plasticizer from the fibers. A wide range of liquids may be employed, however, water is preferred.

In the improved process of this invention, the above described plasticizing and/or boosting liquids are dispersed and/or dissolved in water in concentrations usually below 10% and preferably below 3%. The fibers are then treated in these low concentration liquids. Surprisingly, the fibers are rendered postinflatable about as rapidly and as fully as when they are treated in 100% organic liquids comprising the plasticizer and/or booster liquid.

The aqueous plasticizing and boosting liquids can be used at low concentrations in the three-step processes described by Bonner in U.S. 3,381,077 and by Cichelli et al. in Ser. No. 738,522, filed June 20, 1968. When the improvement of this invention is used with these processes, microcellular staple fibers are treated sequentially (1) in a low concentration of plasticizing liquid dispersed or dissolved in water to temporarily increase the permeability of the cell walls; (2) in a low concentration of boosting liquid dispersed or dissolved in water to introduce impermeant inflatant into the closed cells; and (3) in the usual stripping liquid to remove excess external impermeant inflatant and substantially all the residual plasticizing liquid from the fibers, and to trap the remaining impermeant inflatant within the cells. A two-stage process in which there is no separate plasticizing step preferably may also be used. In this process both the plasticizing and boosting functions are provided by a treatment liquid consisting of a dilute dispersion and/or solution of plasticizer and impermeant inflatant in water. Stripping is then carried out as usual. In each of the above-described processes, after stripping, the fibers are dried and inflated in air. For polyethylene terephthalate fibers, air temperatures from 70° C. to 175° C. are found effective. Heating times of 1 to 30 minutes, varying inversely with the air temperature employed, causes air inflation of the fibers.

The amount of impermeant inflatant imbibed by the cellular fibers in the above-described processes depends on the particular fiber polymer, impermeant inflatant, and plasticizer used, as well as on the conditions of temperature, pressure and concentration employed. For example, when polyethylene terephthalate microcellular fibers are plasticized in a separate step as in the above-described postinflation process, concentrations of methylene chloride in water (dispersed and/or dissolved) in a range between about 0.1 to 3% or even much higher are suitable, so long as there is at least about one-half pound, but preferably about two pounds of methylene chloride available for each pound of fiber treated. Minimum residence times for the fibers in the treatment fluid of about 15 seconds or less are suitable for the higher concentrations; longer times, of up to about 60 seconds or more may be used with lower concentrations. When the concentration of methylene chloride in water is about 1%, a residence time of about 30 seconds is appropriate. Exposure times of greater than 60 seconds are generally avoided in order to minimize dissolving of the fibers. In plasticizing polyethylene terephthalate fibers with methylene chloride, temperatures between about 1 and 40° C. are suitable and atmospheric pressure is preferred.

The process of postinflating polyethylene terephthalate microcellular fibers, as hereinbefore discussed, may include a single plasticizing-and-boosting step or a boosting step that follows the above-described prior plasticizing time. In either case, the suitable ranges of concentration, time, temperature and pressure are about the same (although preplasticizing usually can reduce the holdup time required in the boosting step). A preferred fluid for the boosting step includes methylene chloride, and perfluorocyclobutane dispersed or dissolved in water. In the preferred boosting liquid, water which is saturated with methylene chloride and a small amount of perfluorocyclobutane impermeant inflatant, has dispersed within it a second phase comprising about 96% methylene chloride, 4% perfluorocyclobutane and about 0.1% water. In the boosting step, the concentration of the dispersed phase may range from as low as 0.1 to about 10% or more, with 0.5 to about 3% being preferred. Atmospheric pressure is preferred, although pressurized systems can be used. Temperatures of between about 5 and 20° C. are suitable with 8 to 12° C. being preferred. Within this range, the rate of imbibing of perfluorocyclobutane by the fibers increases with increasing temperature up to about 15° C. At least about 5 pounds of methylene chloride and 0.1 pound of perfluorocyclobutane should be available for each pound of fiber treated, with at least 7 pounds of methylene chloride and 0.25 pound of perfluorocyclobutane per pound of fiber being preferred. A minimum treatment time of about 5 minutes is necessary in order to permeate the fibers with at least about 5 grams of perfluorocyclobutane per 100 grams of fiber under typical conditions described above. Treatment times of longer than 20 minutes are usually not needed, the amount of perfluorocyclobutane imbibed by the fibers remaining about constant after that time. With constant residence time, the amount of impermeant inflatant imbibed by the fibers usually increases with methylene chloride concentrations and inflatant concentration. Thus in general, insofar as quantity of imbibed inflatant is concerned, residence time can be reduced as concentrations are increased, and vice versa.

The following examples illustrate several embodiments in which the improved process of this invention is used to postinflate closed-cell foamed structures. Although the improved postinflation process is suitable for use with sheets, ribbons, filaments, fibers and the like, these examples illustrate the use of the process with ultramicrocellular staple fibers of foamed polyethylene terephthalate which are prepared as follows:

A uniform foamable composition, composed of about 65% polyethylene terephthalate and 35% methylene chloride (both percentages by weight) is extruded through 24 orifices. Temperature and pressure just prior to passage of the composition through the extrusion orifices are about 215° C. and about 650 p.s.i.g. (46 kg./cm.$^2$ gauge), respectively. Each extrusion orifice is a cylindrical hole about 0.012 inch (0.30 mm.) in diameter and about 0.006 inch (0.15 mm.) long. The extruded filaments are spun directly into ambient air and are cut immediately with a flying-knife cutter into 1 to 6-inch long fibers. The fibers collapse, within seconds after spinning and cutting, to a density of about 0.1 g./cm.$^3$ due to methylene chloride condensation within the cells and rapid diffusion through the cell walls. Extrusion rates of up to about 100 lbs./hr. (46 kg./hr.) are used.

The particular impermeant inflatant used in each of the following examples is perfluorocyclobutane. The amount of impermeant inflatant retained within the closed cells of the inflated fibers is determined by weighing an inflated sample, pressing it between hot plates to form a film, and then weighing the film. The weight change divided by the weight of the film multiplied by 100 is equal to the grams of impermeant inflatant per 100 grams of polymer. The temperature of the hot plates is chosen to avoid polymer degradation and permit rapid escape of the inflatant. For polyethylene terephthalate short exposure to 275° C. is satisfactory.

EXAMPLE I

In this example, ultramicrocellular staple fibers of foamed polyethylene terephthalate are postinflated by a process which includes treating the fibers in aqueous solutions containing methylene chloride and perfluorocyclobutane.

A plasticizing bath is prepared by saturating water at about 40° C. and atmospheric pressure with methylene chloride. A boosting bath is prepared by saturating water at about 18° C. and atmospheric pressure with methylene chloride and perfluorocyclobutane. The ultramicrocellular fibers are then carried through the following sequence of steps:

(1) Immersion in the plasticizing bath for about 20 seconds
(2) Immersion in the boosting bath for about 10 minutes
(3) Immersion in hot water at about 70° C. for about 30 seconds to strip methylene chloride and excess perfluorocyclobutane from the fibers
(4) Exposure to hot air at about 100° C. for about 30 minutes
(5) Cooling The resultant fibers are inflated, pneumatic, turgid and contain about 14 grams of perfluorocyclobutane impermeant inflatant per 100 grams of fiber polymer.

This procedure was repeated to yield satisfactory pneumatic fibers with atmospheric, saturated aqueous baths of plasticizer (i.e., methylene chloride) at temperatures between about 30 and 40° C. and of booster (i.e., perfluorocyclobutane and methylene chloride) at temperatures between about 6 and 25° C.

EXAMPLE II

A series of postinflations of ultramicrocellular staple fibers of foamed polyethylene terephthalate further illustrates the improved process of this invention. In this example the plasticizing and boosting are carried out in aqueous solutions and/or dispersions. Uninflated fibers are placed in an open mesh basket inside a one liter autoclave. The autoclave is fitted with a pressure gauge, thermometer, inlet and outlet lines, and a cooling bath. The lines are connected to a small centrifugal pump and are provided with sight glasses, a flow meter, inlet and drain T's. Just upstream of the pump, means are included for injecting liquids into the system when the system is closed and liquid is circulating through it. The total volume of the system is 1850 ml.

In the first run, the system is filled with water and circulated at 10° C. As 34 ml. (44 g.) of methylene chloride are injected into the system in portions over a 10 minute period, the pressure increases from zero to 7 p.s.i.g. and a fine dispersion is visible in the sight glass. Within 3 minutes, 0.30 ml. (0.48 g.) of perfluorocyclobutane at about −10° C. is injected all at once. The pressure increases to 14 p.s.i.g. and then during the next 5 minutes decreases to 8 p.s.i.g. After 10 more minutes, the pressure is relieved, the autoclave quickly opened, and the fibers withdrawn and plunged into water at about 70 to 75° C. for 30 seconds. The fibers are then inflated with air for 10 minutes at 140° C. and subsequently allowed to equilibrate with air at room temperature for about 3 days. The resultant inflated foamed fibers have a density of 0.019 g. of polyethylene terephthalate per cm.$^3$ and contain 11.2 grams of perfluorocyclobutane per 100 grams of polymer, giving 0.26 atmosphere partial pressure of impermeant inflatant within the cells.

In the second run, 2.0 grams of fiber, 44 ml. (57 g.) of methylene chloride and 0.6 ml. (0.96 g.) of perfluorocyclobutane are used in a manner similar to Run No. 1. Total elapsed time between start of methylene-chloride injection and the beginning of hot-water stripping is 10 minutes. The inflated fiber density is 0.022 g. of polymer/cm.$^3$ and the impermeant inflatant content is 10.3 g./100 g. of polymer, giving a partial pressure of 0.28 atm. of impermeant inflatant within the cells.

In a third similar run, 1.23 g. of fiber are used; 30 ml. (39 g.) of methylene chloride are injected in portions over 10 minutes; 0.30 ml. (0.48 g.) of impermeant inflatant is injected all at once at 33° C.; and 15 minutes are spent between the time of inflatant injection and stripping. The inflated fiber density is 0.023 g. polymer/cm.$^3$ and the inflatant content 10.7 g./100 g. polymer, giving a 0.28 atm. partial pressure of impermeant inflatant within the cells.

The solubility of methylene chloride in water under the conditions described in this example is 2.0 grams per 100 grams of water. Thus, in each run the total amount of methylene chloride dissolved in water in the 1850 ml. system is about 37 grams. The solubility of perfluorocyclobutane under these conditions is somewhat uncertain but probably between 0.005 and 0.01 gram per 100 grams of water (which is saturated with methylene chloride).

EXAMPLE III

This example illustrates a preferred continuous process embodying the improvement of this invention. Ultramicrocellular staple fibers of polyethylene terephthalate are postinflated by a process which includes a boosting fluid consisting of a very dilute concentration of plasticizer and impermeant inflatant in water. The boosting and stripping steps are carried out in a pipeline in which the fibers are simultaneously transported and treated.

Ultramicrocellular staple fibers are fed at a rate of about 20 pounds per hour to a vertical pipe in which the fibers are submerged in a low concentration of boosting liquid in water and then transported with the aqueous boosting liquid through a horizontal 900-foot long, 6-inch schedule 10 pipe. The fiber velocity in the horizontal pipe is about 1.0 ft./sec. and the liquid velocity about 1.5 ft./sec. The fibers pass through this pipe entangled in discrete clumps and have a uniform residence time of about 15 minutes. At the end of this pipeline fibers are separated from the liquid by a device which consists of a rotating open mesh cylindrical screen on which the fibers are dropped and through which the liquid passes for recirculation. After passage through a squeeze-roll nip, the fibers are doffed from the screen by means of rapidly rotating brushes and advanced to the vertical submergence pipe-length which leads to the stripping section of the process.

In the above-described boosting portion of this system, the liquid comprises at least about 97 weight percent water and small amounts of plasticizer and impermeant inflatant. The liquid has two phases, a solution phase and a dispersed phase. The solution phase contains about 2 weight percent methylene chloride plasticizer and very small amounts of perfluorocyclobutane impermeant inflatant. The dispersed phase contains 96 weight percent methylene chloride and 4 weight percent perfluorocyclobutane and about 0.1 weight percent water. At the inlet to the long horizontal pipe, the liquid is 99 weight percent solution and 1 weight percent dispersed phase. At the outlet of the pipe, the concentration of the dispersed phase is reduced to 0.65 weight percent, due to the entry of the plasticizer and impermeant inflatant into the cells of the staple fibers. The temperature of the treatment liquid in this boosting section is maintained at 8° C.

The fibers are forwarded immediately after being separated from the boosting section liquid, to the stripping portion of the system. The liquid in this portion of the system is water maintained at about 63° C. The fibers are submerged in water in a vertical pipelength, then forwarded by means of an eductor to an essentially horizontal 8-inch, schedule 10 pipe, the upper 120 degrees of which is well-screen piping to allow escape of perfluorocyclobutane and methylene chloride vapors to solvent recovery. Treatment time in the stripping section is about 15 seconds. The fibers flow through the pipe entangled in discrete clumps at a velocity of about 2 ft./sec. The water velocity is about 4.7 ft./sec. At the end of the stripping section, the fibers and water flow vertically into a fiber-liquid separating device. This device has a horizontal open-mesh screen onto which the fibers and water are dropped. The water passes through the screen and is recycled. The fibers are forwarded on the screen through squeeze rolls and then are doffed from the screen by rapidly rotating brushes. At this point at least about 8 grams of impermeant inflatant (i.e., perfluorocyclobutane with essentially no methylene chloride) per 100 grams of fiber polymer are contained within the closed cells of the fibers.

The fibers removed from the stripping section are then forwarded to a bin through which hot air at 80–125° C. is passed for between 20 and 60 minutes. The fibers are then cooled.

As a result of the treatment given the fibers in this example, the fibers become fully inflated, turgid, round in cross-section and highly pneumatic.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. In a substantially atmospheric pressure process for treating microcellular polymeric staple fibers that are inert to water to render them postinflatable upon exposure to air, which process comprises contacting the fibers with plasticizing liquid, liquid containing impermeant inflatant, and stripping liquid in sequence, the improvement which comprises contacting the fibers with the plasticizing liquid in the presence of water and contacting the fibers with the liquid containing the impermeant inflatant in the presence of water, said plasticizing liquid and said liquid containing the impermeant inflatant being present in the water in amounts between about 0.1% and about 10% by weight of the water present.

2. The process of claim 1 wherein treatment with the plasticizing liquid and liquid containing impermeant inflatant is carried out simultaneously.

3. The process of claim 2 carried out in a pipeline.

4. The process of claim 1 wherein the fibers are prepared from polyethylene terephthalate, the plasticizing liquid is methylene chloride, the liquid containing impermeant inflatant is methylene chloride, the impermeant inflatant is perfluorocyclobutane or chloropentafluoroethane, and the stripping liquid is water.

5. The process of claim 2 wherein the fibers are prepared from polyethylene terephthalate, the plasticizing liquid is methylene chloride, the liquid containing impermeant inflatant is methylene chloride, the impermeant inflatant is perfluorocyclobutane or chloropentafluoroethane, and the stripping liquid is water.

6. The process of claim 3 wherein the fibers are prepared from polyethylene terephthalate, the plasticizing liquid is methylene chloride, the liquid containing impermeant inflatant is methylene chloride, the impermeant inflatant is perfluorocyclobutane or chloropentafluoroethane, and the stripping liquid is water.

References Cited

UNITED STATES PATENTS

| 3,381,077 | 4/1968 | Bonner, Jr. | 260—2.5 E |
|---|---|---|---|
| 3,344,221 | 9/1967 | Moody | 260—2.5 E |
| 3,375,212 | 3/1968 | Bonner, Jr. | 260—2.5 E |
| 3,389,446 | 6/1968 | Parrish | 260—2.5 E |

SAMUEL H. BLECH, Primary Examiner

M. FOELAK, Assistant Examiner

U.S. Cl. X.R.

260—2.5 R; 264—53, 321